United States Patent
Li

(10) Patent No.: US 8,331,612 B2
(45) Date of Patent: *Dec. 11, 2012

(54) METHOD AND SYSTEM FOR DOCUMENT ANNOTATION THAT INCLUDES OUTLINING

(75) Inventor: Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 394 days.

This patent is subject to a terminal disclaimer.

(21) Appl. No.: 12/751,248

(22) Filed: Mar. 31, 2010

(65) Prior Publication Data

US 2011/0243373 A1  Oct. 6, 2011

(51) Int. Cl.
*G06K 9/00* (2006.01)
*G06F 17/00* (2006.01)

(52) U.S. Cl. .......... 382/100; 382/194; 715/230

(58) Field of Classification Search .......... 382/100, 382/112, 113, 114, 135–138, 168, 173, 190–194, 382/232, 233, 254, 263–264, 274, 275, 276, 382/305, 312; 715/209, 230, 202, 233; 358/1.15

See application file for complete search history.

(56) References Cited

U.S. PATENT DOCUMENTS

| | | | | |
|---|---|---|---|---|
| 5,638,504 A | * | 6/1997 | Scott et al. | 715/202 |
| 5,765,176 A | * | 6/1998 | Bloomberg | 715/209 |
| 5,920,685 A | * | 7/1999 | Romano et al. | 358/1.15 |
| 7,730,391 B2 | * | 6/2010 | Madam | 715/233 |
| 7,975,216 B2 | * | 7/2011 | Woolf et al. | 715/230 |

OTHER PUBLICATIONS

Gonzalez, et al., Digital Image Processing, reprinted in 1993, pp. 518-564, Addison-Wesley Publishing.
U.S. Appl. No. 12/751,222, filed Mar. 31, 2010, Xing Li.

* cited by examiner

*Primary Examiner* — Seyed Azarian
(74) *Attorney, Agent, or Firm* — Pillsbury Winthrop Shaw Pittman, LLP

(57) ABSTRACT

A method for producing an electronic annotated document including embedding annotation information into an electronic annotation object having image data including an annotation, and producing the electronic annotated document using pixel information from the electronic document and the electronic annotation object. The annotation embedded information may be used to select corresponding pixel information from one of the electronic annotated object and electronic document to be provided in the electronic annotated document. A system and tangible storage medium having machine-readable instructions for producing an electronic annotated document are also disclosed.

23 Claims, 8 Drawing Sheets

FIG. 8

| 0,0,0,0 | 0,0,0,0 | 0,0,0,0 | 0,0,0,0 | 0,0,0,0 | 0,0,0,0 | 0,0,0,0 | 0,0,0,0 | 0,0,0,0 | 0,0,0,0 | 0,0,0,0 |
|---|---|---|---|---|---|---|---|---|---|---|
| 0,0,0,0 | 1,1,1,1 | 1,1,1,1 | 1,1,1,1 | 0,0,0,0 | 0,0,0,0 | 0,0,0,0 | 0,0,0,0 | 0,0,0,0 | 0,0,0,0 | 0,0,0,0 |
| 0,0,0,0 | 1,1,1,1 | 255,255,255,255 | 1,1,1,1 | 1,1,1,1 | 1,1,1,1 | 1,1,1,1 | 1,1,1,1 | 1,1,1,1 | 0,0,0,0 | 0,0,0,0 |
| 0,0,0,0 | 1,1,1,1 | 255,255,255,255 | 255,255,255,255 | 255,255,255,255 | 255,255,255,255 | 255,255,255,255 | 255,255,255,255 | 255,255,255,255 | 1,1,1,1 | 0,0,0,0 |
| 0,0,0,0 | 1,1,1,1 | 255,255,255,255 | 255,255,255,255 | 255,255,255,255 | 255,255,255,255 | 255,255,255,255 | 255,255,255,255 | 255,255,255,255 | 1,1,1,1 | 0,0,0,0 |
| 0,0,0,0 | 1,1,1,1 | 255,255,255,255 | 1,1,1,1 | 1,1,1,1 | 1,1,1,1 | 1,1,1,1 | 1,1,1,1 | 1,1,1,1 | 0,0,0,0 | 0,0,0,0 |
| 0,0,0,0 | 1,1,1,1 | 1,1,1,1 | 1,1,1,1 | 0,0,0,0 | 0,0,0,0 | 0,0,0,0 | 0,0,0,0 | 0,0,0,0 | 0,0,0,0 | 0,0,0,0 |
| 0,0,0,0 | 0,0,0,0 | 0,0,0,0 | 0,0,0,0 | 0,0,0,0 | 0,0,0,0 | 0,0,0,0 | 0,0,0,0 | 0,0,0,0 | 0,0,0,0 | 0,0,0,0 |

FIG. 9

METHOD AND SYSTEM FOR DOCUMENT ANNOTATION THAT INCLUDES OUTLINING

FIELD

This application generally relates to digital image processing, and in particular, performing document annotation.

BACKGROUND

Annotation is an important feature in many printers, facsimile machines and multifunctional devices. Conventional devices, typically offer two modes of annotation: opaque and transparent annotating.

In the opaque mode, typically a white box with annotating text replaces the area to be annotated. On the other hand, in transparent mode, the annotating text is superimposed on the original image. Conventionally, the transparency mode has been used for bi-level (or binary image data). This may be performed, for instance, using an "OR" logic operation between the original pixel values and the corresponding annotating text values in the specified area.

The transparency mode using the OR logic operation, however, does not extend naturally to multi-level image data, or for color image data.

SUMMARY

According to one embodiment of this disclosure, a method for annotating an electronic document comprises: determining outlining pixels surrounding an annotation in an electronic annotation object having image data; embedding annotation information identifying the outlining pixels into the electronic annotation object; and producing an electronic annotated document using pixel information from the electronic document and the electronic annotation object.

According to another embodiment of this disclosure, a system for annotating an electronic document comprises: one or more processors configured to: determine outlining pixels surrounding an annotation in an electronic annotation object having image data; embed annotation information identifying the outlining pixels into the electronic annotation object; and produce an electronic annotated document using pixel information from the electronic document and the electronic annotation object.

According to yet another embodiment of this disclosure, a tangible storage medium has machine-readable instructions stored therein that when executed by one or more processor are configured to annotate an electronic document. The instructions comprise: an annotation module that is configured to: (i) determine outlining pixels surrounding an annotation in an electronic annotation object having image data; (ii) embed annotation information identifying the outlining pixels into the electronic annotation object; and (iii) produce an electronic annotated document using pixel information from the electronic document and the electronic annotation object.

Other features of one or more embodiments of this disclosure will seem apparent from the following detailed description, and accompanying drawings, and the appended claims.

BRIEF DESCRIPTION OF THE DRAWINGS

Embodiments of the present disclosure will now be disclosed, by way of example only, with reference to the accompanying schematic drawings in which corresponding reference symbols indicate corresponding parts, in which:

FIG. 8 shows exemplary image data of an annotation object with embedded or encoded pixel values that are used for annotating in accordance with an embodiment; and FIG. 9 shows exemplary image data of an annotation object with embedded or encoded pixel values that are used for annotating in accordance with an embodiment.

DETAILED DESCRIPTION

This application is related to subject matter disclosed in co-pending U.S. patent application Ser. No. 12/751,222, entitled "METHOD AND SYSTEM FOR DOCUMENT ANNOTATION," filed Mar. 31, 2010, herein incorporated by reference in its entirety.

According to an aspect of this disclosure, a methodology is described for performing annotating in electronic documents. Annotating is performed electronically on the electronic document, for instance, using an application as further discussed herein.

Figure 1:
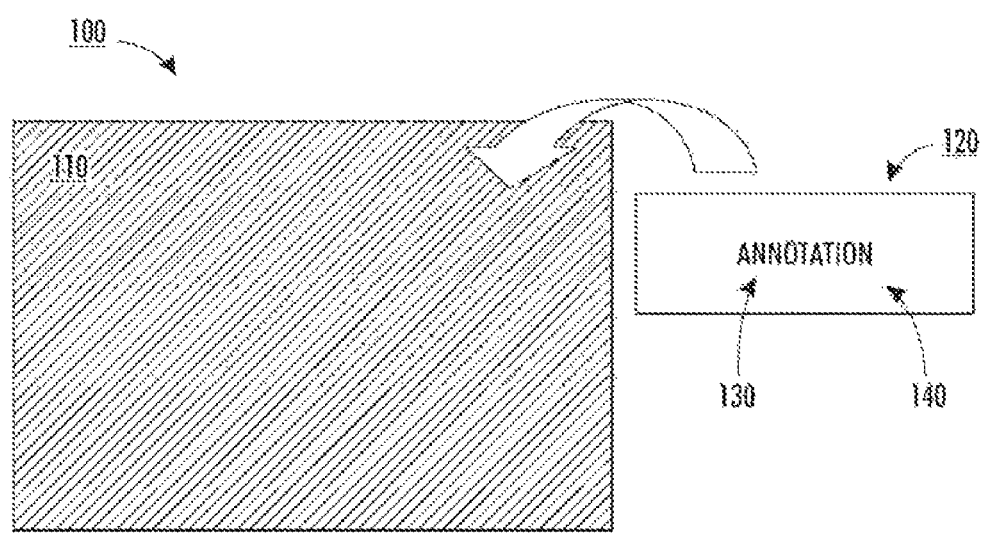
FIG. 1 illustrates a methodology for annotating electronic documents in accordance with an embodiment.

FIG. 1 illustrates a methodology 100 for annotating electronic documents in accordance with an embodiment.

An electronic document 110 may be provided, which was generated, converted and/or stored in various electronic formats. As used herein, "electronic document" means any electronic media content that is intended to be used in an electronic form or printed output. Exemplary electronic document files types may include various digital image, text, and mixed content files, such as PDF, TXT, DOC, TIFF, BMP, GIF, JPEG, and other common page description language (PDL) file and document formats, such as Adobe® Post-script®. Pixels in the electronic document 110 may be formatted as Red-Green-Blue (RBG), cyan-magenta-yellow-black (CMYK), a device-independent color space (e.g., CIE-LAB, YCrCb, XYZ, etc.), or other pixel formats. Conversions from one color space to another may also be possible, for instance, as known in the art.

Binary image data is single bit or bi-level, with only two possible values. More particularly, pixel values may be either ON (e.g., value=1) denoting an active pixel, or OFF (e.g., value=0) denoting background.

On the other hand, for multi-bit image data, there may be various tones or shades possible. Multi-bit image data may be, for instance, 4-bit, 8-bit, 12-bit, or greater. For 8-bit image data, for example, there may be $2^8$ or 256 different possible values for each pixel, with a pixel value of "0" representing one extreme (e.g., absence of tone or the fullest/darkest tone) and a pixel value of 255 representing the other extreme. Such image data is typically referred to as "grayscale" image data, ranging from white to black with various incremental shades of gray in between.

For color image data, typically each pixel is composed of a plurality of process colors. Process colors may be additive colors, such as, red, green or blue (RGB) or subtractive colors, such as cyan, magenta, yellow (CMY), which together form a color gamut (i.e., the complete set of possible colors that may be formed). Additional or redundant process colors may also be included, as known in the art, such as black (K). Color image data may have multiple color separations or planes corresponding to each process color expressed as continuous tone (or "contone") image data. Like grayscale image data, contone image data is multi-bit containing color and grayscale image data For instance, consider 8-bit CMYK image data. Each pixel may have multiple color separations or planes, one for each of the process color.

An annotation object 120 may be superimposed in the electronic document 110 at a predetermined location either selected by a user or by default. The annotation object 120 generally includes annotation 130 and background 140, which may be predetermined or user-defined. As used herein, "annotation" means any information that is to appear displayed in an electronic document. For instance, as shown, annotation 130 may include text. It will be appreciated though that annotations may include text, symbols, indicia, a time/date stamp, page number(s), phone number(s), address(es), digital signature(s), watermark(s), confidential or propriety statement(s), legal disclaimer(s), image(s), etc, or combinations thereof. The size of an annotation object 120 may depend generally on the size and/or shape of annotation 130. Typically, both electronic document 110 and annotation object 120 may be a two-dimensional array of pixels.

The annotation 130 may be generated, converted and/or stored in various electronic formats, including compressed image formats. Exemplary files types may include various digital image, text, and mixed content files, such as PDF, TXT, DOC, TIFF, BMP, GIF, JPEG, and other common page description language (PDL) file and document formats, such as Adobe® Postscript®. The annotation 130 may be formatted as Red-Green-Blue (RGB), cyan-magenta-yellow-black (CMYK) or monochrome image data (although other image formats might also be used).

The background 140 generally is of a predetermined color (e.g., white) which may be noticeably different from the annotation 130. For transparent annotating the background 140 will not be used in the electronic annotated document. Annotation 130 may be generated, for instance, by keystrokes from a graphical user interface (GUI) input by a user, prestored objects from memory, and/or automated or default objects.

According to one or more embodiments, an electronic annotated document is generated based on the electronic document 110 and the annotation object 120. Both the annotation object 120 and the annotated document may be generated in substantially "real-time," or the annotated document 110 may be produced from an annotation object 120 that was previously generated and stored in memory. In some implementations, the electronic annotated document may not be a new document, per se, but rather a modified version of electronic document 110 incorporating image data from the annotation object 120.

Figure 2:
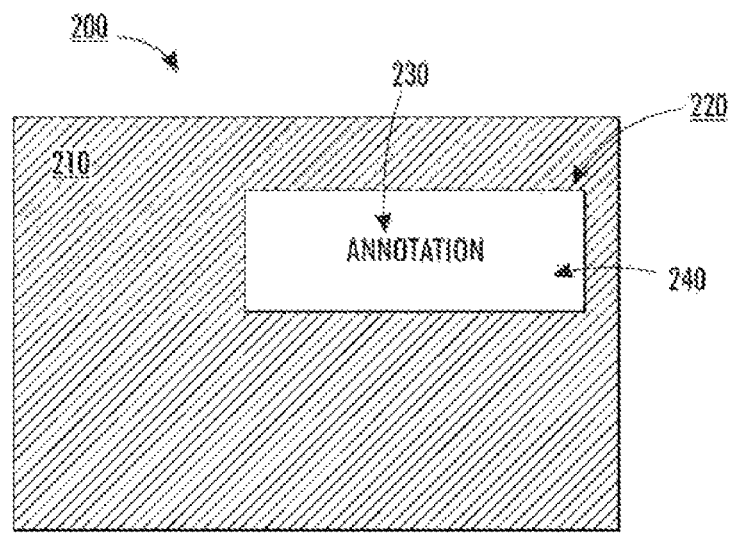
FIG. 2 shows an electronic annotated document having an opaque annotation in accordance with an embodiment.
Figure 3:
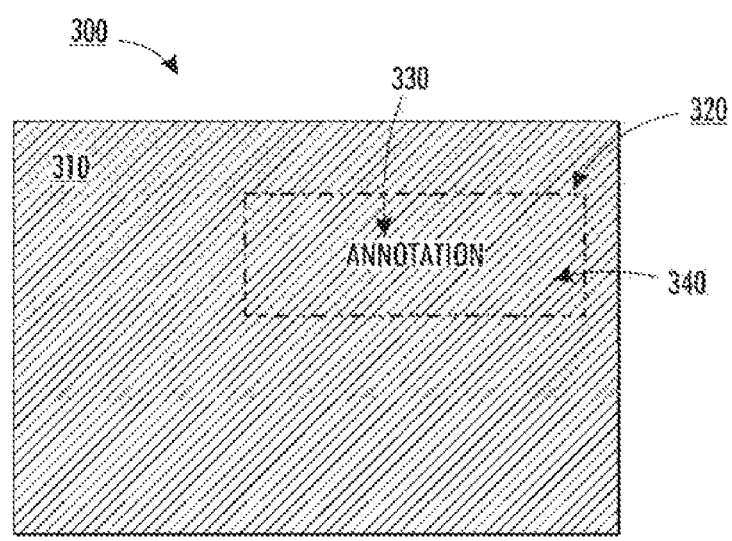
FIG. 3 shows an electronic annotated document having a transparent annotation in accordance with an embodiment.

FIGS. 2 and 3 illustrate two exemplary electronic annotated documents, having opaque and transparent annotation, respectively, in accordance with embodiments.

FIG. 2 shows an electronic annotated document 200 having an opaque annotation. An opaque annotating object 210 may be thought as being superimposed in electronic document 210 at a predetermined location therein, either selected by a user or by default. The opaque annotation object 220 generally includes pixels corresponding to an annotation 230 and background 230. For instance, as shown, the annotation 230 may include text. The background 240 generally is of a predetermined color (e.g., white) which may be noticeably different from the annotation 230. In simplistic terms, both annotation 230 and background 240 may "appear" placed on top of the electronic document 210 in the electronic annotated document 200

FIG. 3 shows an electronic annotated document 300 having a transparent annotation. A transparent annotation object 320 may be thought as being superimposed in electronic document 310 at a predetermined location therein, either selected by a user or by default. The transparent annotation object 320 generally includes pixels corresponding to an annotation 330 and background 340. For instance, as shown, the annotation 330 may include text. In transparent annotating, the background 330 may appear to be the same as the corresponding electronic annotated document 300. Thus, only annotation 330 (and not background 340) "appears" seamlessly placed in electronic annotated document 300.

Figure 4:
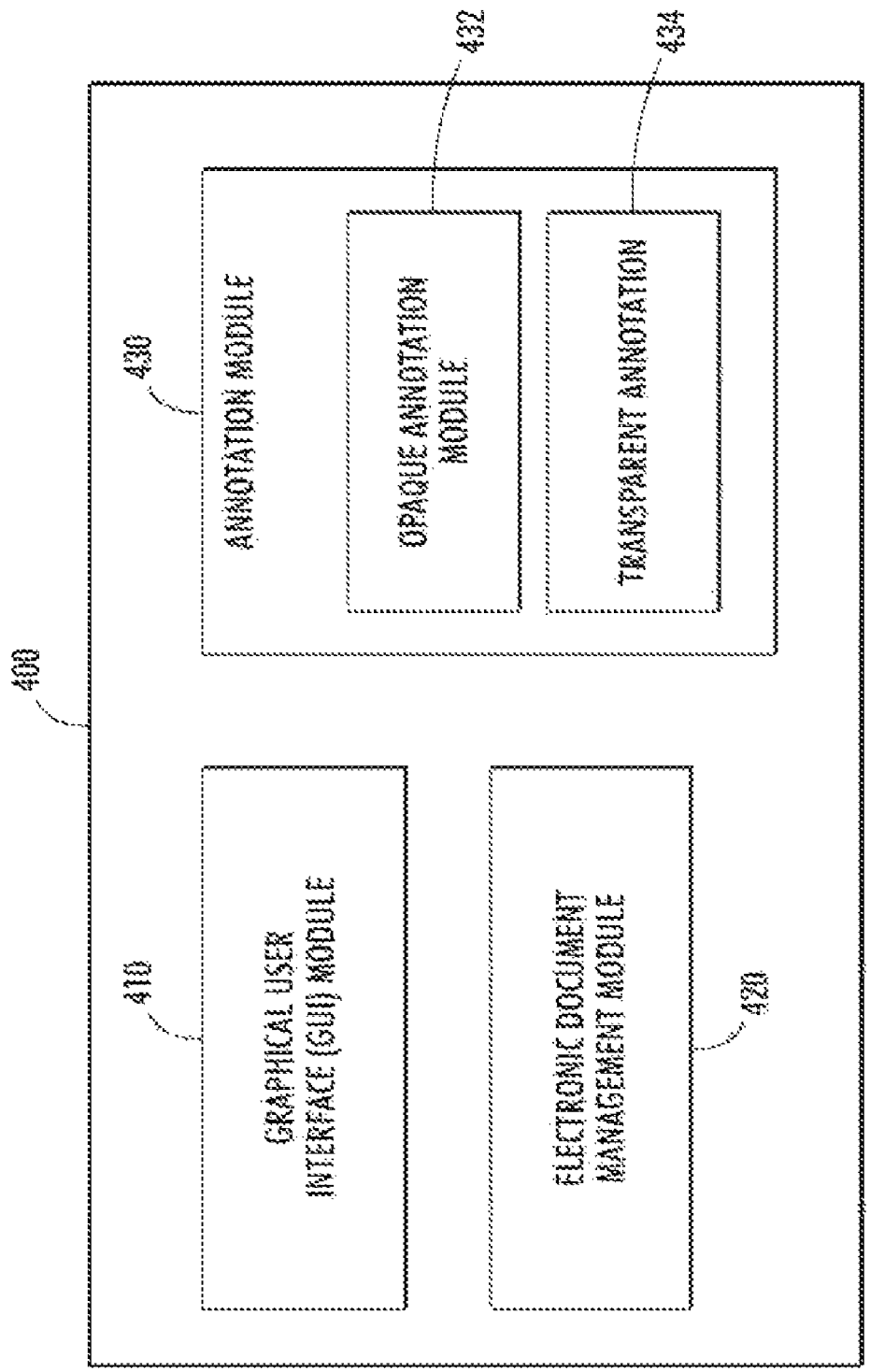
FIG. 4 shows an exemplary application for annotating electronic documents in accordance with an embodiment.

FIG. 4 shows an exemplary application 400 for annotating electronic documents in accordance with an embodiment.

The application 400 may include a plurality of modules, including but not limited to, a graphical user interface module 410, an electronic document management module 420, and an annotation module 430. One or more of the modules comprising application 400 may be combined. For some purposes, not all modules may be necessary.

According to one embodiment, the application 400 may include dedicated hardware, such as, an application specific integrated circuit (ASIC) or field programmable gate array (FPGA), software (firmware), or a combination of dedicated hardware and software. Of course, it will be appreciated that any number of hardware and/or software implementations, programming languages, and operating platforms may be used. As such, the description or recitation of any specific hardware or software implementation, programming language, and operating platform herein is exemplary only and should not be viewed as limiting. For the different applications of the embodiments disclosed herein, the programming and/or configuration may vary.

As software, for instance, the application 400 may be stored on a computer- or machine-readable storage media having computer or machine-executable instructions executable by one or more processors. In one implementation, the application 400 may reside on a memory of a print controller of a printing system or the printing system of another device such as a facsimile machine or multifunctional device. Memory device may include, for example, any non-volatile electronic memory device (e.g., flash memory, EEPROM, etc.) or other memory device (e.g., disk drive, writable optical disk, etc.) for storing electronic image data.

Alternatively or additionally, the application 400 may be a stand-alone application running on a computer which interfaces with a printing system, for example, through a remote network connection, or via a computer readable storage media (i.e., flash memory, DVD/CD ROM, floppy disk, removable or permanent hard drive etc.). In some implementations, the application 400 may be a "plug-in" application that is incorporated into a third-party software application including, for example, document-processing or image production applications. Other configurations may be also implemented.

The graphical user interface (GUI) module 410 is configured to generate a graphical user interface on a display device and to control the various display and input/output (I/O) features of the application. The GUI module 410 may generate display signals to the display device. In one implementation, it may provide one more "windows" or panes for displaying information to the user. The display device may include a cathode ray tube (CRT), liquid crystal display (LCD), plasma, or other display devices. In some implementations, the display device may be incorporated into a printing device, facsimile machine, multifunctional device, or other device.

Moreover, the GUI module 410 allows the user to interact with the application 400. For example, the GUI module 410 may permit use and operation of one more of: a keyboard, keypad, touch-screen, mouse, joystick, light pen, or other peripheral devices for receiving inputs from a user. Similarly, the application may output information and data to the user, for example, via a printer, facsimile machine, multifunctional device or other peripheral device (e.g., external storage device or networked device).

The electronic document management module 420 is configured to allow a user to manage electronic documents. Electronic documents may be scanned images, downloaded images, user-created or edited images, etc. In one implementation, the electronic document management module 420 may be configured to access one or more jobs from a job manager, digital front end, server, or a memory of a printing system, facsimile machine, multifunctional device, or other device. The electronic document management module 420 may generate and display a plurality of "thumbnails" (e.g., smaller images corresponding to the pages of an electronic document for preview by the user) for the user to select. Additionally, the electronic document management module 420 may enable the user to "open" and "close" documents, and/or allow the user to edit (or modify) to documents.

The annotation module 430 is configured to permit a user to perform annotating of an electronic document. The annotation module 430 renders an electronic annotated document having the annotation, which may be subsequently stored in memory, communicated electronically (e.g., via a network), and/or printed.

In some implementations, annotation module 430 may enable users to define or input one or more annotations, select placement location in electronic documents for annotation, format annotation (e.g., select color, font, size, layout, etc.) and/or customize or edit stored, automated and/or default generated annotations. For instance, the annotated module 430 may also provide a preview option in which the user can "see" how the annotated document will look like if, or when it is generated.

The annotation module 430 may include opaque annotation module 432 and transparent annotation module 434 for separately handling both opaque and transparent annotation modes.

Opaque annotation module 432 may be configured to replace pixel values in the electronic document with corresponding pixel values from an annotation object. This effectively replaces a portion of the original electronic document with an annotation object box in the electronic annotated document in a manner as similarly shown in FIG. 2.

Transparent annotation module 434 may be configured to select corresponding pixel information from one of the electronic annotated object and electronic document to be provided in the electronic annotated document.

Thus, the background portion of the annotation object will generally appear transparent to the user with respect to the electronic annotated document. The annotated document appears seamlessly placed on the electronic document in electronic annotated document in a manner as similarly shown in FIG. 3.

A methodology for performing annotation for grayscale or continuous tone images is further disclosed. The methodology may advantageously be applied to grayscale and contone color images According to an aspect, an electronic annotated document may be produced using pixel information from the electronic document and the electronic annotation object. Annotation may include multiple modes. Three modes of annotation are discussed in more detail below with respect to FIGS. 5-7.

The modes assume image color data in which a pixel value of zero denotes no tone (such as in CMYK color space). However, it may not always be the case that "0" represents the background or white and 255 is the darkest tone for 8-bit image data. It will be appreciated that the processes can be similarly adapted for other color spaces, for example, RGB, in which the highest values represent no tone. Thus, where the pixel value zero is discussed, the logic may be adapted to use the highest pixel value (e.g., 255 for 8-bit RGB data) instead.

Figure 5:
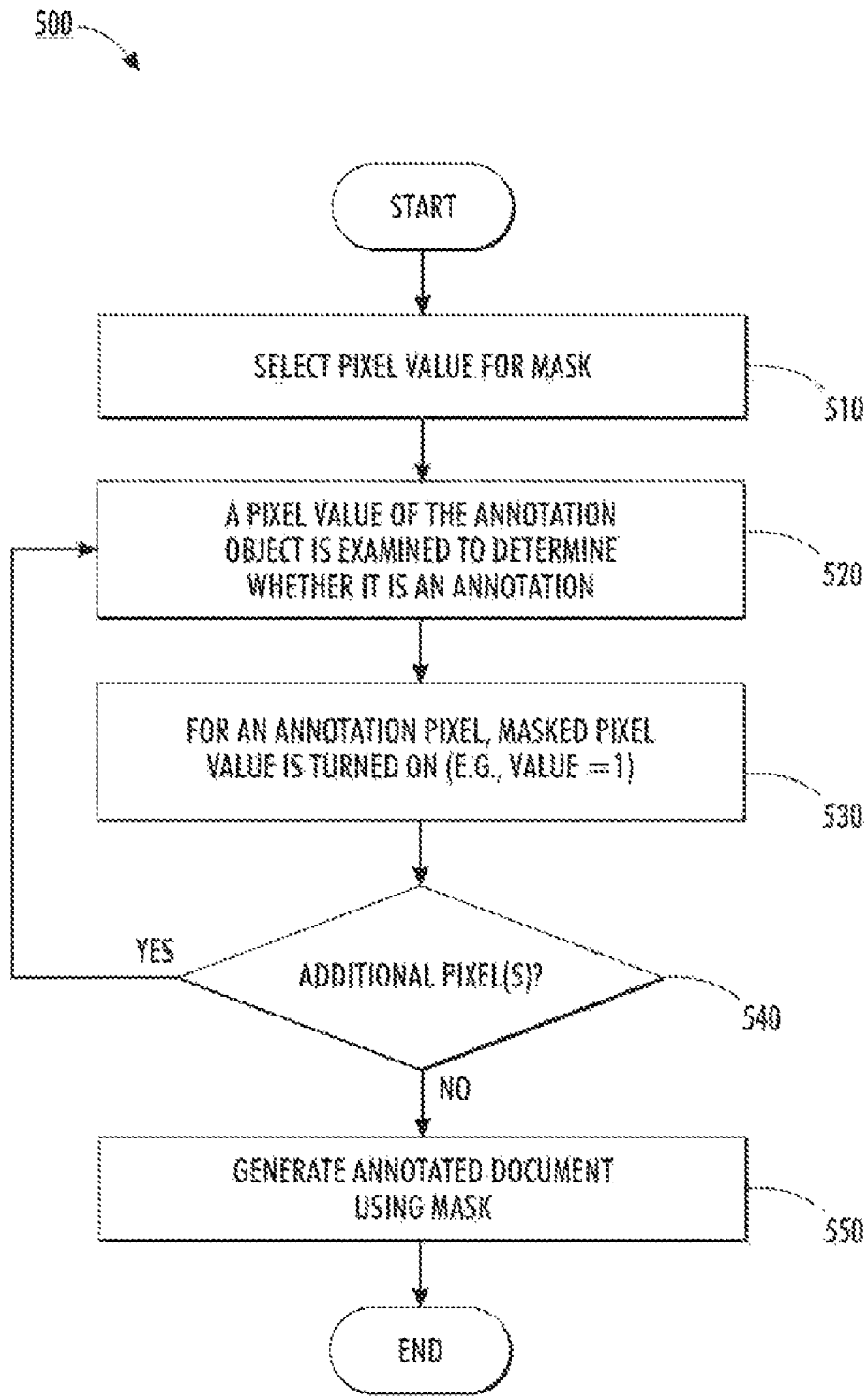
FIG. 5 shows a first mode for annotating an electronic document in accordance with an embodiment.

FIG. 5 shows a first mode 500 for annotating an electronic document in accordance with an embodiment.

This first mode 500 uses a binary mask to specify the shape of the annotation. All pixel values of the annotation object may be first stored in a set of registers (or other storage device).

In step 510, one pixel value (or color) may be associated with the mask to be used for all pixels on the annotation. That means that the color will be constrained in the annotated document. For example, if the 4 bytes of data are C MY K=[0, 255, 255, 0] then all pixels in the annotation will be "red." Typically for annotating, the pixels of the annotation (e.g., text) are all the same color, so this may not present an issue. An algorithm could be used to determine a pixel value (or color) which is solely, or predominantly used (e.g., greater than 50%), in the annotation Although, a specific color may be associated with the annotation object, different annotations may have different colors. This value may be stored as 4 bytes of data for CMYK color space.

The mask is next generated, for example, using steps 520-540. The mask may essentially define the outline of the annotation. In step 520, a pixel value of the annotation object is examined. A determination may be made whether the pixel is that of the annotation of the annotation object, for instance, by looking to whether the pixel has some tone, in at least one separation. In step 530, for an annotation pixel of the annotation object, the mask pixel value may be set to ON (e.g., value=1).

On the other hand, for background pixels (other than the annotation) of the annotation object, the mask pixel value may be set to OFF or left as default (e.g., value=0). This means that the corresponding pixel color of the electronic document will be later used in the annotated document. The process repeats until a determination is made in step 540 that all pixels in the annotation object have been considered.

In some implementations, the mask can be prepared well in advance of the annotation process. In addition, other methods for generating masks might also be used as known in the art.

Next, in step 550, the mask is used to generate the electronic annotated document. The first mode does not look at the specific pixel values of the annotation object or the electronic document for output. Instead, the output is determined by the binary mask. For instance, if a mask bit is ON (value=1) then the pixel value associated with the mask (from step 510) will be used for corresponding pixels in the annotated document. Otherwise, if a mask bit is OFF (value=0), then the pixel value of the electronic document will be used.

This first mode may minimize memory resources and fast processing may be realized. Although, this mode may not handle varying tones among different pixels in annotation.

Figure 6:
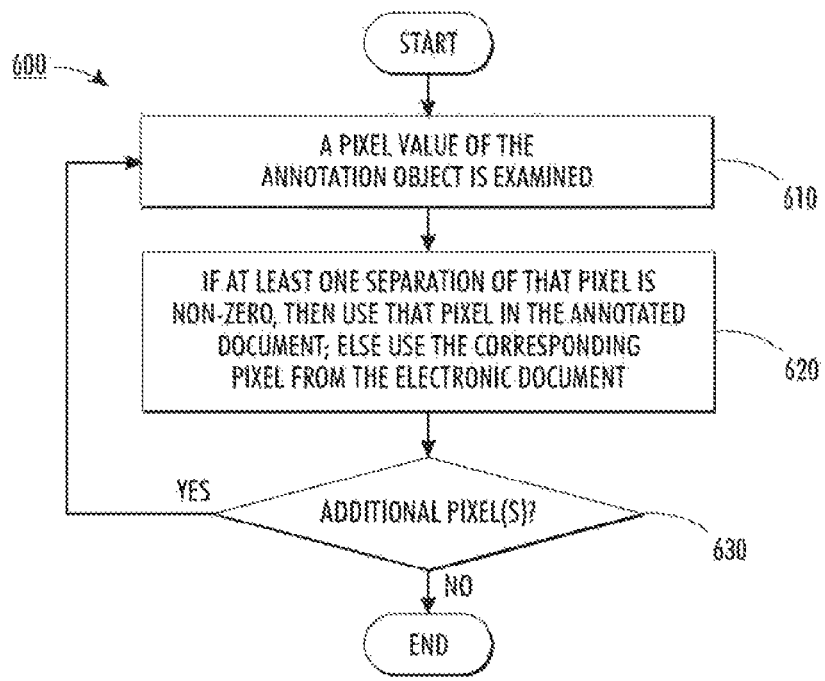
FIG. 6 shows a second mode for annotating an electronic document in accordance with an embodiment.

FIG. 6 shows a second mode 600 for annotating an electronic document in accordance with an embodiment.

In the second mode 600, the electronic annotated document may be generated by selectively using pixel values from the annotation object instead of corresponding pixels from the electronic document when the pixel value in the annotating object is non-zero. If at least one separation value of a given pixel in the annotation object is non-zero, that pixel value may be used in for the corresponding pixel in the electronic document. This mode preserves the tonal variation within the annotation object.

All pixel values of the annotation object may be first stored in a set of registers (or other storage device). In step 610, a pixel value of the annotation object is examined.

In step 620, if at least one color separation value of the annotation object is non-zero (or perhaps greater than some low value, such as 5 or 10 for 8-bit image data), that pixel's values may be used for the corresponding pixel values in the annotated document. For contone image data composed of multiple process color separations, the pixel values for each process color may be considered simultaneously.

Otherwise, the value of the corresponding pixel in the electronic document will used. As such, only non-zero values of pixels in the annotation object (i.e., having some tone) will be used in the annotated document. The process repeats until a determination is made in step 630 whether all pixels in the annotation object have been considered.

Figure 6A:
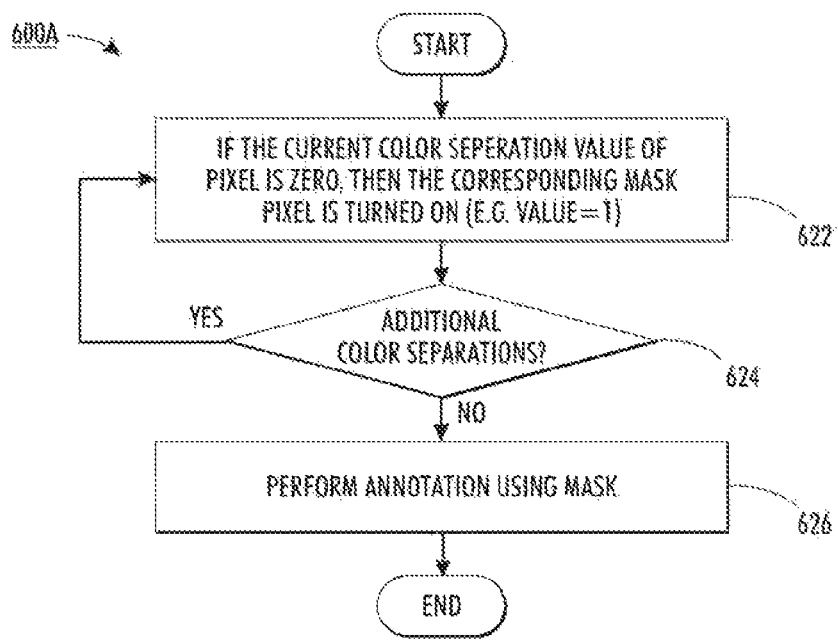

FIG. 6A shows an alternative implementation of the step 620A of the second mode 600. For contone image data composed of multiple color planes, each color plane may be operated on separately, using an one-bit mask or flag to indicate the source for output (from annotating object or from the original image).

The processing in step 620A may go through each of the color separations for a pixel of the annotation object, one-by-one. In step 622, if that color separation value is non-zero (or perhaps greater than some low value, such as 5 or 10 for 8-bit image data), then the corresponding mask pixel will be set ON (e.g., value=1). The process repeats to the next color separation until determination is made in step 624 that that all color separations have been considered. In some implementations, the mask can be prepared well in advance of the annotation process. In addition, other methods for generating masks might also be used as known in the art.

Once all the color separations have been consider, in step 626, the mask is utilized to perform annotating of the electronic annotated document. If a mask bit is ON (value=1) then the corresponding pixel in the electronic annotated document will use the pixel value of the annotation object which is stored in the registers. Otherwise, the value of the corresponding pixel in the electronic document will used. It will be appreciated that step 626 can also be performed after step 630 (i.e., once all pixels in the annotation object have been considered).

The alternative implementation may reduce processing resources by separately considering the amount of data considered for each color plane rather than all color planes simultaneously. However, some additional memory resources may be required. Consider an example in which the size of the annotation object is 1200×300 pixels. In the first implementation of the second mode 600, 1200×300×4, or 1,440,000 bytes of data will be used, while 1200×300×4+1200×300/8=1,485,000 bytes of data will be used for the alternative implementation of the second mode 600.

Figure 7:
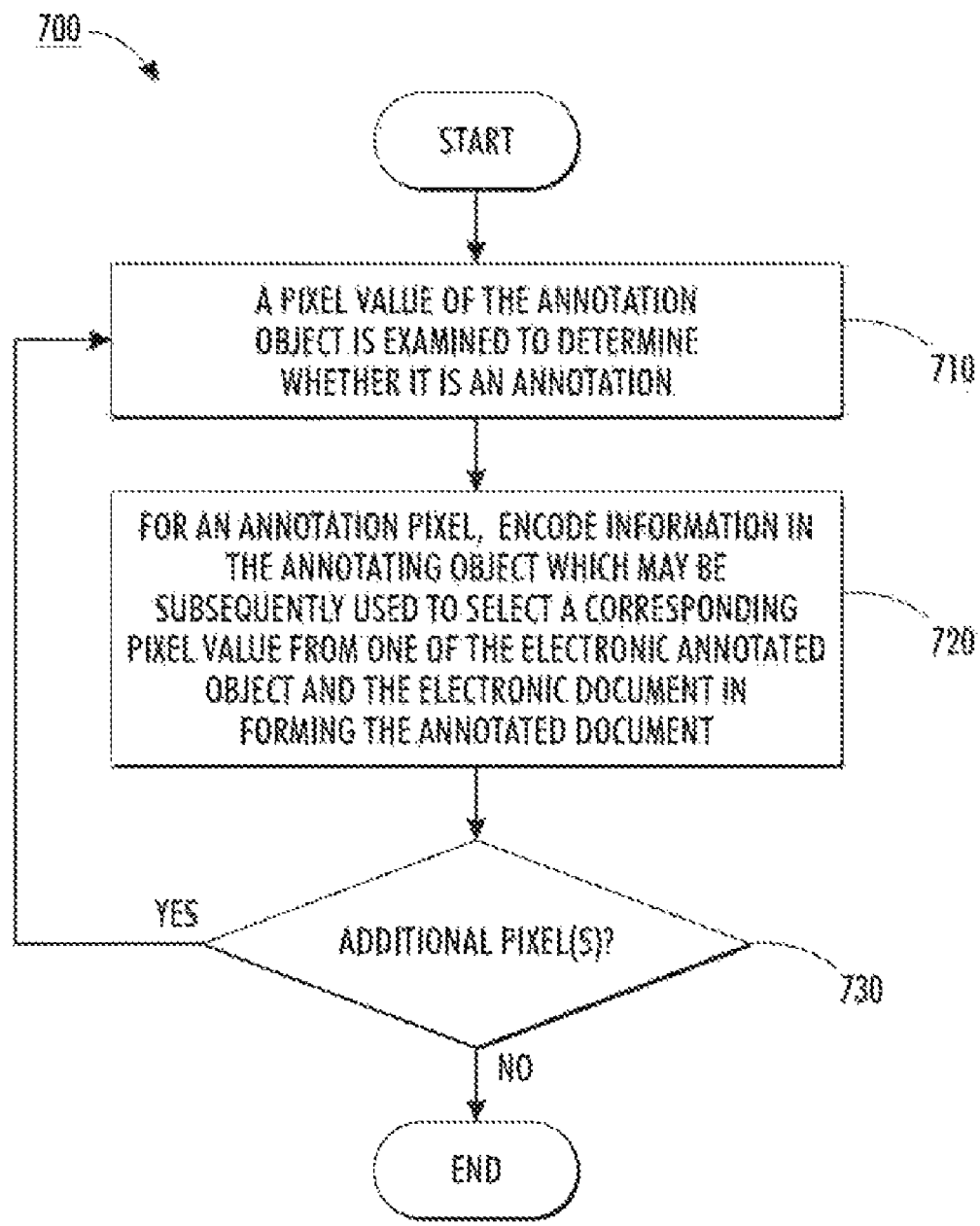
FIG. 7 shows a third mode for annotating an electronic document in accordance with an embodiment.

FIG. 7 shows a third mode 700 for annotating an electronic document in accordance with an embodiment.

Information may be embedded or encoded into the annotation object which will be later used to specify corresponding pixel values in the electronic annotated document. As such, the more intensive data processing may be performed in generating the annotated object, rather than in generating the large annotated document. This may provide a significant savings for processing resources. This mode may not rely on a mask.

First, in step 710, a pixel value of the annotation object is examined. A determination may be made whether the pixel is that of the annotation or background, for instance, by looking to whether the pixel has some tone in at least one separation. In some implementations, step 710 may be optional. It may be a way of preparing the annotation object which could be performed separately.

Then, in step 720, preset (or reserved) grayscale values, such as "0" and "1," may be inserted into the annotation object to enable subsequent annotation of grayscale. For contone image data this may be performed for each color separation. When generating the electronic annotated document, pixels values corresponding to the preset or reserved values may be inserted therein. The process repeats until a determination is made in step 730 that all pixels in the annotation object have been considered.

For instance, in generating the annotation object, the value "0" may be reserved for the pixels that will keep their original value and a low value, such as "1" may be used to indicated annotation pixels. Of course, other preset (or reserved) values might similarly be used. To put it another way, when performing the actual annotation, the annotation module is programmed, in advance, to know which value in the annotation object is reserved to indicate to use "0" as the output. Once a reserve value is programmed, that value will not be a valid choice for the desired annotation pixel color value. For example, if "0" is to indicate use the electronic document pixel value and "1" is to indicate change the pixel value to "0", then a pixel value of C, M, Y, K=[0, 0, 0, 0] in the annotation object would be interpreted to use the electronic document pixel value as output.

On the other hand, since a pixel value of C, M, Y, K=[150, 160, 130, 150] in the annotation object includes neither "0s" nor "1s", the annotation module will not alter the value in the annotation object. Thus, it will stay C, M, Y, K=[150, 160, 130, 150]. And, if the intention is to use the pixel color value C, M, Y, K=[0, 130, 150, 0] to annotate the image, an "encoded" value of [1, 130, 150, 1] may be placed in the annotation object instead. The annotation module knows that "1" is intended to be changed to "0."

Figure 8:
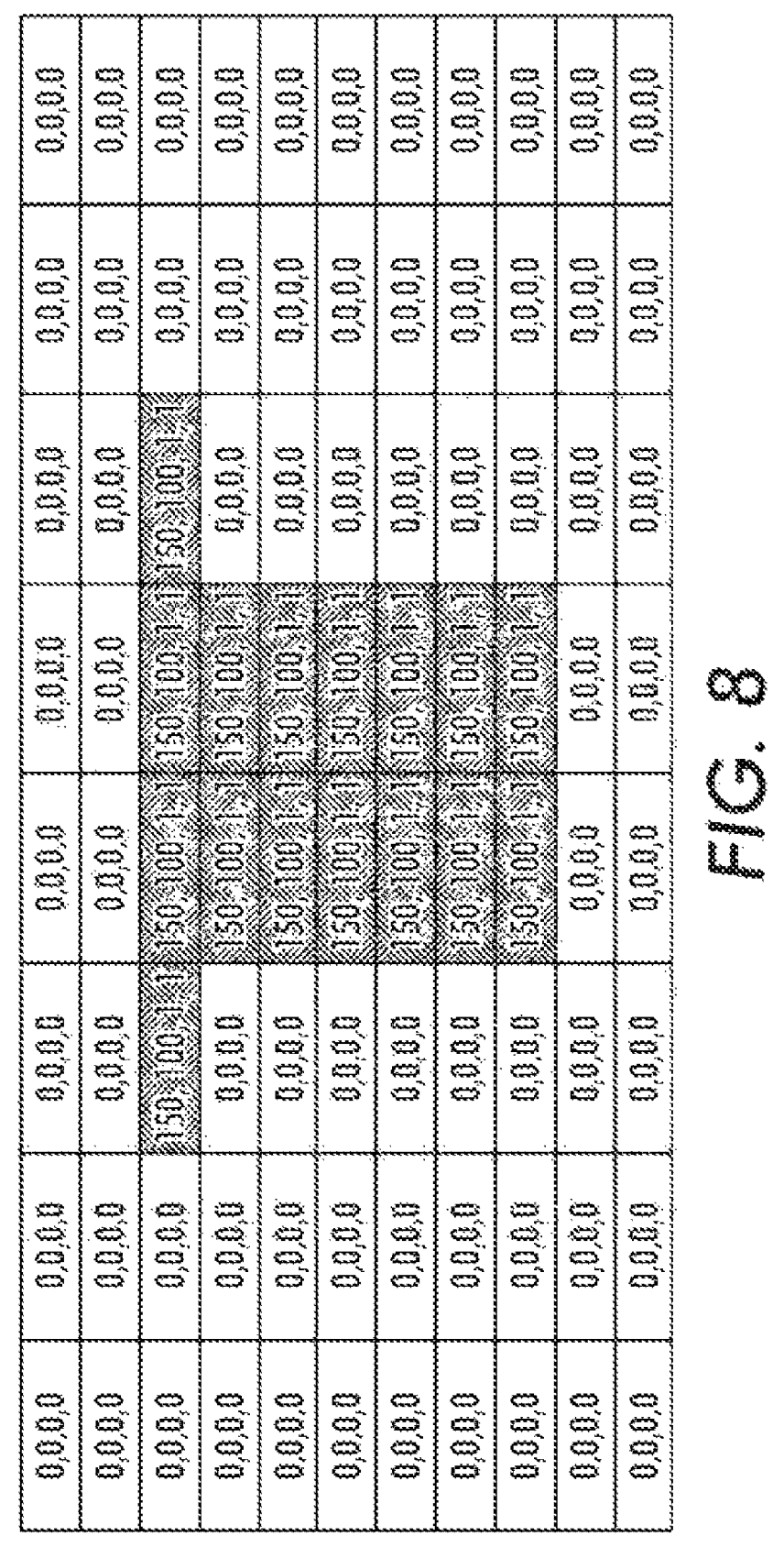

FIG. 8 shows exemplary image data of an annotation object with embedded or encoded pixel values that are used for annotating in accordance with an embodiment. As shown, in FIG. 8, the annotation corresponds to the letter T.

If the value of a pixel in the annotation object, for instance, is C, M, Y, K=[150, 100, 1, 1], then the corresponding pixel value in the subsequent annotated document will be C, M, Y, K=[150, 100, 0, 0]. On the other hand, if the value of a pixel in the annotation object, for instance, is C, M, Y, K=[0, 0, 0, 0], then the corresponding pixel value in the annotated document will be that of the corresponding pixel value of the electronic document.

One problem with the transparent annotating, however, is that if the annotation color is the same as, or very close, to the color of the corresponding pixel in the electronic document then the annotation may appear invisible or may be difficult to distinguish.

Thus, according to a further embodiment, a method for performing transparency annotation may be capable of distinguishing the annotation from the electronic document without the need to change the color of the annotation. In general, this may be performed by having an outline on the shape of the annotation.

For instance, the outline of the shape of the annotation in the annotation object may be encoded or embedded in the annotation object itself. For example, in the annotation object, the value "0" may denote the pixels that need to keep the original value in the annotated document and a low value, such as "1", may be assigned to pixels in the outline. That low pixel value may also be used to indicate that pixel values will be set to a predetermined background color, such as white.

In some implementations, one or more morphological operations may be used to define an outline of the annotation. Morphological operations generally include erosion and/or dilation steps. Various morphological operations, including erosion and dilation of image data, are disclosed, for example, in *Digital Image Processing* by Rafael C. Gonzalez and Richard E. Woods (Addison-Wesley Publishing), reprinted 1993, pp. 518-564, herein incorporated by reference in its entirety. Dilation and erosion steps may be combined to provide image processing. It will be appreciated that in other embodiments, other text-, image-boundary or edge-identifying algorithms may similarly be used.

FIG. 9 shows exemplary image data of an annotation object with embedded or encoded pixel values that are used for annotating in accordance with an embodiment.

In one implementation, encoded pixels may be used to outline the annotation. As shown, in FIG. 9, the annotation corresponds to the letter T. Outlining pixels may be any numbers of pixels in thickness. As shown, the outline pixels have a thickness of 1 pixels from the annotation.

Of course, the pixel thickness of the outline could be larger, or perhaps, the entire background of the annotation object could be similarly embedded or encoded (if desired). The latter approach may be similarly used for opaque annotating.

Pixels having a value of C, M, Y, K=[0, 0, 0, 0] will use the pixel value of the electronic document in the annotated document. This ensures that only those pixels of the electronic document corresponding to the background of the annotation object are used.

On the other hand, pixels with value of C, M, Y, K=[1, 1, 1, 1] identify outlining pixels that will be set to a predetermined background color, such as white.

The pixels with value of C, M, Y, K=[255, 1, 255, 1] include an annotation. These were generated using the third mode 700, described above, to identify these pixels as the annotation. These values will later be decoded when the annotation operation is performed and the resultant pixel values in the annotated document will be C, M, Y, K=[255, 0, 255, 0].

Some individuals, though, may find outlining formed around the annotation to be objectionable. For instance, this may appear as a "halo" around the annotation.

Thus, according to yet a further embodiment, a method for automatically adjusting the color of the annotation object based on the corresponding pixel color in the electronic document may be provided. In some implementations, outlining pixel values may be determined dynamically based on the color of the annotation and its corresponding background pixels, instead of always being set to the same predetermined color, as previously discussed.

In the outline pixel area, the value of the background pixel may be adjusted to ensure that it will be sufficiently visually different from the pixels in the annotation object. The annotation need not have an outline. In other words, if the color of the annotation is sufficiently different from the color of the electronic document then there may be no need to have or add the outline. Yet, when the color of the annotation is close to that of the electronic document, then the edge of the annotation may be turned into an outline which is adjusted to be sufficiently different from the original document. This may include raising or lowering pixel values as necessary. This dynamic approach may be more computationally intensive, especially if the annotating object is not of constant color. Although, it may have the benefit of not showing an outline.

The color of outlining pixels may be automatically adjusted based on the color of corresponding pixels in the electronic document. More specifically, if the outline pixel color is close to that of the corresponding pixel in the electronic document by a certain threshold DIFF then the outline pixels' color is changed so that it will have sufficient color difference from the color of the corresponding pixels in the electronic image.

The following is exemplary logic for one embodiment for automatically adjusting the values of outlining pixels based on the color of the corresponding pixel in the electronic image.

if $\max(|C_O-C_A|, |M_O-M_A|, |Y_O-Y_A|, |K_O-K_A|) < DIFF$ then $C_A' = COEF*C_A$ $M_A' = COEF*M_A$ $Y_A' = COEF*Y_A$ $K_A' = COEF*K_A$ In the above logic, $C_A$, $M_A$, $Y_A$ and $K_A$ denote the C, M, Y and K values of an outlining pixel, $C_O$, $M_O$, $Y_O$ and $K_O$ denote the C, M, Y and K values of a corresponding pixel in the electronic document, and $C_A'$, $M_A'$, $Y_A'$ and $K_A'$ denote the C, M, Y and K values of the adjusted outlining pixel.

DIFF and COEF may be programmable parameters. DIFF may be, for instance, 20. In one implementation, COEF may be determined based on DIFF and the maximum of $C_A$, $M_A$, $Y_A$ and $K_A$, by solving the following equations:

$\max(|C_O-C_A'|, |M_O-M_A'|, |Y_O-Y_A'|, |K_O-K_A'|) >= DIFF$ then $(1-COEF)*\max(C_A, M_A, Y_A, K_A) = 2*DIFF$ or $COEF = 1 - 2*DIFF/\max(C_A, M_A, Y_A, K_A)$ In the above equations, the value of 2*DIFF is used because there may not have been a prior check to see if an outlining pixel value is greater or smaller than the color value for the corresponding pixel in the electronic document. Without checking whether the annotating pixel or the electronic original pixel values is larger, and in order to make sure that the difference after adjustment is sufficient, this "over adjust" may be preformed. For example, if the difference between the two is to be at least 20, the value in the annotation object can be altered to make the DIFF large enough.

However, to adjust down by 2*DIFF may be too much for all cases. So one implementation may provide two coefficients to choose from (e.g., based on which one is bigger, Co or Ca). Of course, there may be other coefficients. Thus, one of COEF1 and COEF2 may be selected to be used as COEF based on some additional condition checking as follows:

$COEF1 = 1 - 2*DIFF/\max(C_A, M_A, Y_A, K_A)$ $COEF2 = 1 - DIFF/\max(C_A, M_A, Y_A, K_A)$ if $C_O > C_A'$ or $M_O > M_A'$ or $Y_O > Y_A'$ or $K_O > K_A'$ then COEF=COEF2 else COEF=COEF1

To make the color closeness checking even more sophisticated, an additional logic scenario to handle composite black (i.e., black comprised of only CMY) may be provided. For example, the following condition for adjustment may be used:

$$\max(C_A, M_A, Y_A) \text{ is 0 and } |\min(C_O, M_O, Y_O) + K_O) - K_A| >= \text{DIFF}$$

The three modes described above apply to grayscale image data. It will also be appreciated that they may operate on individual color separations or planes separately, or on all color separation or planes simultaneously. Furthermore, for one or more modes described herein, it will be appreciated that they may also be configured to perform opaque mode annotation. In that case, pixels in the annotated document can be set to the color white (or some other pre-defined color) when the mask bit is OFF (e.g., in modes 1 and 2) or as embedded or encoded pixel values in the annotating object dictate (e.g., in mode 3).

While this disclosure has been described in connection with what is presently considered to be the most practical and preferred embodiments, it is to be understood that it is capable of further modifications and is not to be limited to the disclosed embodiments, and this disclosure is intended to cover any variations, uses, equivalent arrangements or adaptations of the inventive concepts following, in general, the principles of the disclosed embodiments and including such departures from the present disclosure as come within known or customary practice in the art to which the embodiments pertains, and as may be applied to the essential features hereinbefore set forth and followed in the spirit and scope of the appended claims.

What is claimed is:

1. A method for annotating an electronic document comprising:
   determining outlining pixels surrounding an annotation in an electronic annotation object having image data;
   embedding annotation information identifying the outlining pixels into the electronic annotation object; and
   producing an electronic annotated document using pixel information from the electronic document and the electronic annotation object.

2. The method according to claim 1, wherein the annotation object comprises grayscale or contone image data.

3. The method according to claim 1, wherein the outlining pixels are determined by one or more morphological operations.

4. The method according to claim 1, wherein the outlining pixels have a pixel thickness surrounding the annotation of at least one pixel.

5. The method according to claim 1, wherein the embedded annotation information in the annotation object comprises a preset value that identifies that pixel as an outlining pixel.

6. The method according to claim 1, wherein the embedded annotation information in the annotation object comprises a preset value that is used to select corresponding pixel information from one of the electronic annotated object and electronic document to be provided in the electronic annotated document.

7. The method according to claim 1, wherein, in producing the electronic annotated document, pixels in the electronic annotated document which correspond to outlining pixels in the annotation object are set to the a predetermined color associated with the outlining pixels.

8. The method according to claim 1, wherein pixel information for the outlining pixels is dynamically determined and adjusted so as to ensure that outlining pixels are visually different from the corresponding pixels in the electronic document.

9. The method according to claim 1, wherein the annotating is one of opaque and transparent annotation.

10. The method according to claim 1, wherein the annotation object includes a background.

11. A system for annotating an electronic document comprising:
    one or more processors configured to: determine outlining pixels surrounding an annotation in an electronic annotation object having image data;
    embed annotation information identifying the outlining pixels into the electronic annotation object; and
    produce an electronic annotated document using pixel information from the electronic document and the electronic annotation object.

12. The system according to claim 11, wherein the annotation object comprises grayscale or contone image data.

13. The system according to claim 11, wherein the outlining pixels are determined by one or more morphological operations.

14. The system according to claim 11, wherein the outlining pixels have a pixel thickness surrounding the annotation of at least one pixel.

15. The system according to claim 11, wherein the embedded annotation information in the annotation object comprises a preset value that identifies that pixel as an outlining pixel.

16. The system according to claim 11, the embedded annotation information in the annotation object comprises a preset value that is used to select corresponding pixel information from one of the electronic annotated object and electronic document to be provided in the electronic annotated document.

17. The system according to claim 11, wherein, in producing the electronic annotated document, pixels in the electronic annotated document which correspond to outlining pixels in the annotation object are set to the a predetermined color associated with the outlining pixels.

18. The system according to claim 11, wherein pixel information for the outlining pixels is dynamically determined and adjusted so as to ensure that outlining pixels are visually different from the corresponding pixels in the electronic document.

19. The system according to claim 11, wherein the annotating is one of opaque and transparent annotation.

20. The system according to claim 11, wherein the annotation object includes a background.

21. A tangible storage medium having machine-readable instructions stored therein that when executed by one or more processor are configured to annotate an electronic document, the instructions comprising:
    an annotation module that is configured to:
    (i) determine outlining pixels surrounding an annotation in an electronic annotation object having image data;
    (ii) embed annotation information identifying the outlining pixels into the electronic annotation object; and
    (iii) produce an electronic annotated document using pixel information from the electronic document and the electronic annotation object.

22. The instructions according to claim 21, wherein the annotation module is further configured to perform one of more of the following: (iv) enable a user to select a placement location of the annotation in the electronic annotated document. (v) enable a user to select one of opaque and transparent annotation; or (vi) enable a user to format an annotation by selecting one or more of: color, font, size, or layout.

23. The instructions according to claim 21, wherein annotation includes keystrokes input from a graphical user interface (GUI), prestored objects retrieved from memory, or a default object.

* * * * *